United States Patent [19]

Hyoi

[11] Patent Number: 5,127,723
[45] Date of Patent: Jul. 7, 1992

[54] EYEGLASS FRAME WITH DUAL STRUCTURE BRIDGE MEMBER

[75] Inventor: Isao Hyoi, Fukui, Japan
[73] Assignee: Murai Co., Ltd., Fukui, Japan
[21] Appl. No.: 543,843
[22] PCT Filed: Nov. 18, 1988
[86] PCT No.: PCT/JP88/01165
 § 371 Date: Jul. 17, 1989
 § 102(e) Date: Jul. 17, 1989
[87] PCT Pub. No.: WO90/05934
 PCT Pub. Date: May 31, 1990
[51] Int. Cl.⁵ .............................. G02C 5/02
[52] U.S. Cl. ........................ 351/124; 351/41
[58] Field of Search .............. 351/41, 124, 125, 126, 351/128, 129, 130, 131, 132, 133, 134, 135

[56] References Cited
FOREIGN PATENT DOCUMENTS 382227  9/1923  Fed. Rep. of Germany ...... 351/124
60-59219 4/1985 Japan .
63-214716 9/1988 Japan .

Primary Examiner—Rodney B. Bovernick
Attorney, Agent, or Firm—Armstrong, Nikaido, Marmelstein, Kubovcik & Murray

[57] ABSTRACT

The present invention relates to eyeglasses and, more particularly, to eyeglass made of an NT alloy. An eyeglass frame comprises rims (2) for supporting a pair of right and left eyeglass lenses, and bridges (6) for connecting the rims (2). The bridges (6) has a dual structure, and opposite ends of the respective bridges are connected to the front and rear portions of the rims (2). The bridges of the eyeglass frame having the above-described arrangement are secured by securing engagement tubes made of nickel silver or the like to opposite ends of each of the bridges by pinching and securing the engagement tubes to the inner sides of the respective rims by soldering. With this arrangement, it is possible to impart strength to the eyeglass frame and to achieve a design which provides a preferable appearance.

6 Claims, 2 Drawing Sheets

EYEGLASS FRAME WITH DUAL STRUCTURE BRIDGE MEMBER

DESCRIPTION

1. Technical Field

The present invention relates to an eyeglass frame employing a material which is extremely difficult to work, for example, an NT alloy (shape memory alloy).

2. Background Art

A conventional eyeglass frame of this type is shown as an eyeglass frame 100 in FIG. 4. The eyeglass frame 100 is made of an NT alloy (shape memory alloy) and comprises rims 102 which support eyeglass lenses 101, respectively. A temple 104 is connected to each of the rims 102 by means of a side joint 103. A bridge 105 is mounted to connect the rims 102. The bridge 105 is of an inverted-U shape and has two ends 105a and 105b. The ends 105a and 105b are connected to the respective rims 102 to support the pair of rims 102.

In this arrangement, a wire which forms the rims 102 and bridge 105 has a general thickness.

However, the eyeglass frame 100 according to the above-described prior art has the problem that, since the bridge 105 is formed from a single wire, the eyeglass frame 100 has a weak strength and the rims 102 are relatively displaced and deformed by forces applied to the eyeglass frame 100.

To solve the above-described problem, if the bridge 105 is made thick to increase the strength, the external appearance or design of the eyeglass frame 100 is adversely affected.

DISCLOSURE OF THE INVENTION

The present invention has been devised in light of the above-described prior art problems, that is, the fact that the strength of a bridge is weak and an eyeglass frame is easily deformed, as well as for the purpose of improving an appearance which constitutes design. In an eyeglass frame comprising rims for supporting a pair of right and left eyeglass lenses and a bridge for connecting the rims, the bridge has a dual structure and opposite ends of the respective bridges are connected to the front and rear portions of the rims. In this arrangement, the rims are not relatively bent due to forces acting on the eyeglass frame, so that it is not necessary that a bridge is mounted on the upper portions of the rims since the two bridges completely support the rims of the eyeglasses to prevent the eyeglasses from being deformed.

Accordingly, since the configuration of the upper portions of the rims can be freely altered in accordance with the demands of users, it is possible to provide many kinds of design, whereby excellent design can be created.

BEST MODE FOR CARRYING OUT THE INVENTION

An embodiment of the present invention will be described below with reference to the accompanying drawings.

Figure 1:
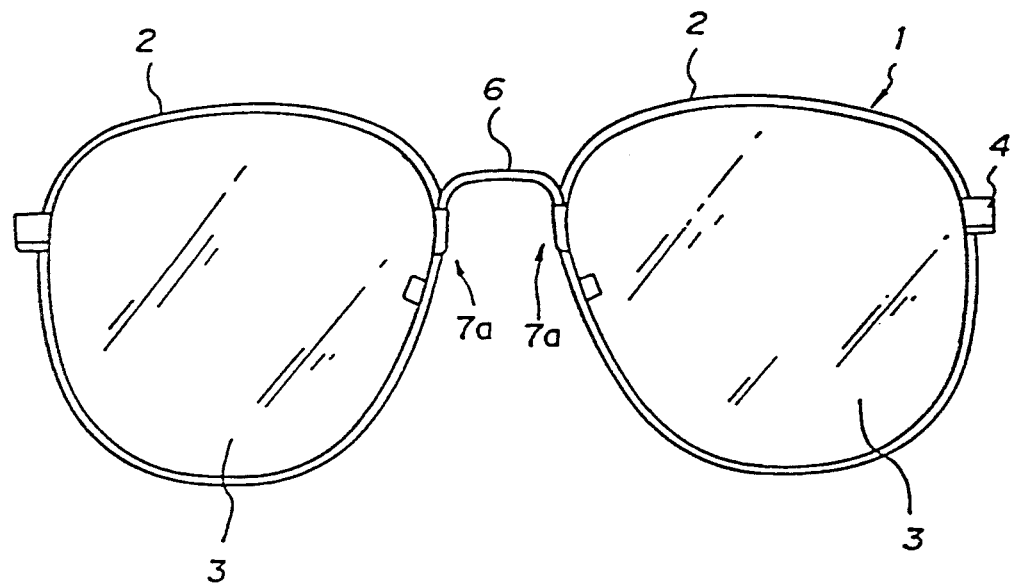
FIG. 1 is a front elevational view showing an eyeglass frame according to the present invention.

FIG. 1 is a front elevational view showing an eyeglass frame according to the present invention, and the eyeglass frame is indicated generally at 1. The eyeglass frame 1 comprises a pair of rims 2. Each of the rims 2 is provided with a lens 3 having a substantially circular shape. Side joints 4 are provided on both sides of the substantially circular lenses 3. Temples 5 are secured to the respective side joints 4 for pivotal motion with respect to the corresponding rims 2.

The eyeglass frame 1 is also provided with a bridge 6 for connecting the rims 2 to each other. The bridge 6 has an inverted U-shaped form, and a bottom 6c is slightly bent forwardly and has ends 6a. Engagement tubes 7a formed of nickel silver or the like are secured to the opposite ends 6a of the bridge 6. The securing of the engagement tubes 7a is performed by inserting the engagement tubes 7a into the opposite ends 6a of the bridge 6 and externally pinching the engagement tubes 7a.

The engagement tubes 7a may be inserted into the opposite ends 6a of a bridge 6 having a straightforward shape and, after the engagement tubes 7a have been externally pinched, the bridge 6 may be bent into an U-like form.

Figure 2:
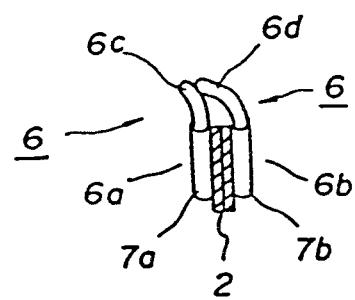
FIG. 2 is a side elevational view showing the eyeglass frame according to the present invention.
Figure 3:
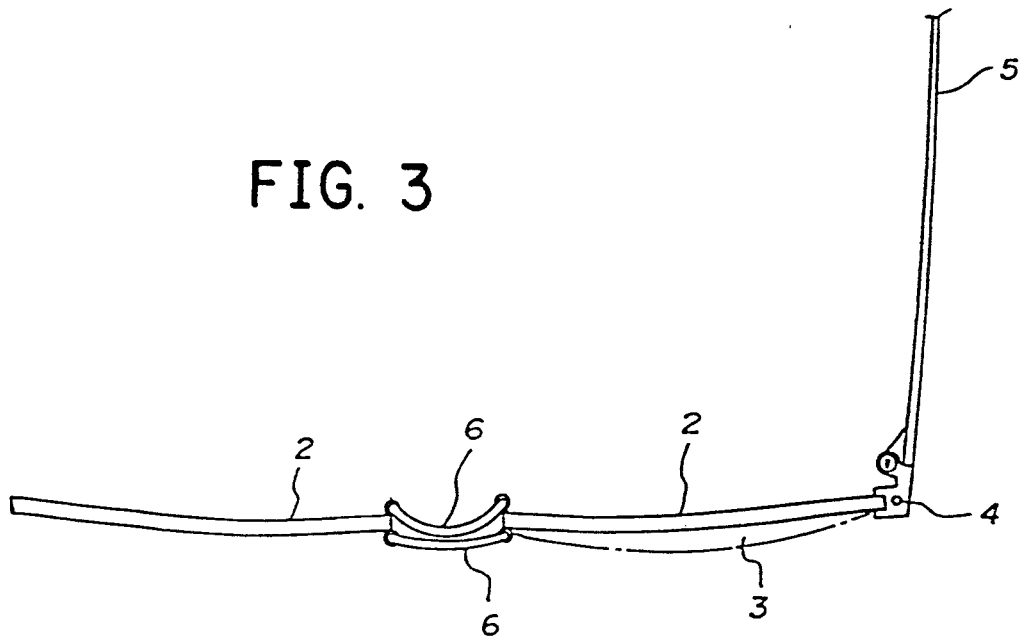
FIG. 3 is a plan view showing the eyeglass frame according to the present invention.
Figure 4:
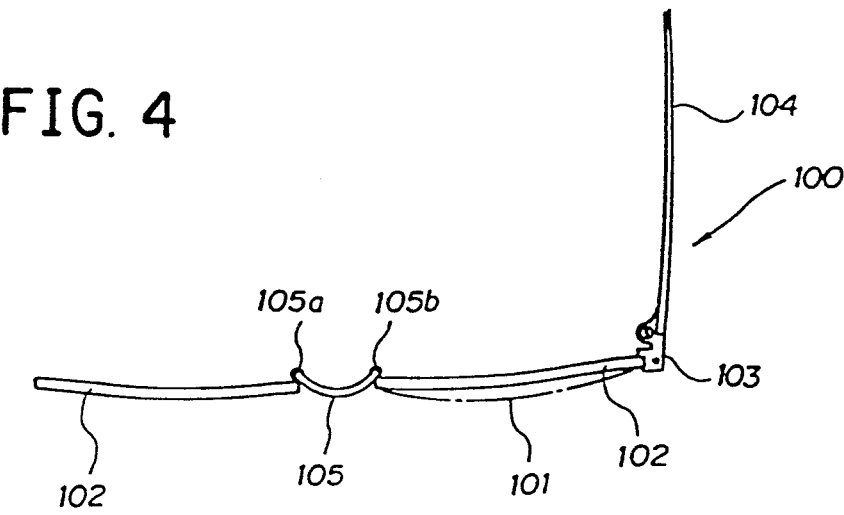
FIG. 4 is a plan view showing an eyeglass frame according to a prior art.

Then, the engagement tubes 7a are secured to the front portions of opposing sides of the respective rims 2 of the eyeglass frame 1 by soldering or the like. Then, engagement tubes 7b provided on opposite sides of another bridge 6 are respectively secured to the rear faces of the rims 2 in the rearward of the corresponding engagement tubes 7a in such a manner that each of the rims 2 is sandwiched between the opposing tubes 7a and 7b. In this arrangement, as viewed from one side, a bottom 6d of the bridge 6 is bent forwardly to a great extent compared to the bottom 6c of the bridge 6 which is located forwardly, in such a manner that the bridges 6 come into contact with each other (refer to FIG. 2). As viewed from the front side, the two bridges 6 appear to be completely superposed on each other and the rims 2 appear to be supported by a single bridge 6. Accordingly, an appearance based on excellent design can be achieved.

In addition, since the pair of rims 2 is supported by the two bridges 6, sufficient strength and rigidity can be achieved and the rims 2 can be reliably supported.

Accordingly, since it is not necessary to mount a special bar for supporting the pair of rims 2, the number of parts can be reduced.

Furthermore, since the curve of the upper portion of each of the rims 2 can be freely designed because there is no bar, it is possible to meet a variety of demands of users.

In the present invention, although the bridges 6 are made of an NT alloy, they may, of course, be made of another kind of material which is extremely difficult to work.

INDUSTRIAL APPLICABILITY

The eyeglass frame according to the present invention is applicable to an eyeglass frame made of a material which is extremely difficult to work, particularly an NT alloy (shape memory alloy). Accordingly, strength can be effectively increased, whereby the deformation of the eyeglass frame can be prevented, and an excellent design can be achieved. Accordingly, the present invention is applicable to a wide variety of eyeglass frames.

I claim:

1. An eyeglass frame for a pair of right and left eyeglass lenses, comprising:
    rims for supporting the eyeglass lenses;
    joint members fixed to outermost sides of said rims; and
    a bridge member for connecting said rims, said bridge member having a dual structure including two bridge pieces having opposite ends, connected to front and rear portions of said rims.

2. An eyeglass frame according to claim 1, wherein said bridge member includes one bridge piece which is bent into a U-shape relative to a line which is parallel to a front face of the eyeglass lenses, and another bridge piece which is substantially straight relative to said line.

3. An eyeglass frame according to claim 1, wherein one of said bridge pieces is attached to front portions of said rims, and another of said bridge connected to a rear portion of said rims, and a gap is maintained between the two bridge pieces.

4. An eyeglass frame according to claim 1, wherein temple members are pivotally mounted to said joint members.

5. An eyeglass frame according to claim 2, wherein temple members are pivotally mounted to said joint members.

6. An eyeglass frame according to claim 3, wherein temple members are pivotally mounted to said joint members.

* * * * *